(12) United States Patent
Zhang et al.

(10) Patent No.: US 8,929,895 B2
(45) Date of Patent: Jan. 6, 2015

(54) APPARATUS AND METHOD FOR MOVING WCDMA MOBILE STATION IN THE MANNER OF THE LEAST PACKET LOSS

(75) Inventors: Kevin Zhang, Shanghai (CN); Peter Ramle, Moelnycke (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 391 days.

(21) Appl. No.: 13/262,258

(22) PCT Filed: Sep. 29, 2009

(86) PCT No.: PCT/CN2009/001075
§ 371 (c)(1),
(2), (4) Date: Oct. 27, 2011

(87) PCT Pub. No.: WO2010/111814
PCT Pub. Date: Oct. 7, 2010

(65) Prior Publication Data
US 2012/0033659 A1    Feb. 9, 2012

(30) Foreign Application Priority Data
Mar. 31, 2009 (WO) .................. PCT/EP2009/002340

(51) Int. Cl.
H04W 36/00  (2009.01)
H04W 36/30  (2009.01)
H04W 36/02  (2009.01)

(52) U.S. Cl.
CPC .......... *H04W 36/0033* (2013.01); *H04W 36/30* (2013.01); *H04W 36/02* (2013.01)
USPC ......................................... 455/436

(58) Field of Classification Search
USPC ......... 370/331, 235, 236, 338, 352, 353, 356; 455/422.1, 433, 436, 445, 448, 450, 455/458, 459, 466, 509, 517
See application file for complete search history.

(56) References Cited

U.S. PATENT DOCUMENTS

| | | | |
|---|---|---|---|
| 6,233,458 B1 * | 5/2001 | Haumont et al. ............. | 455/445 |
| 2002/0131396 A1 * | 9/2002 | Knuutila et al. ............. | 370/349 |
| 2002/0150084 A1 * | 10/2002 | Lee et al. ...................... | 370/352 |
| 2004/0127238 A1 | 7/2004 | Bianconi et al. | |
| 2005/0157673 A1 * | 7/2005 | Verma et al. .................. | 370/328 |
| 2005/0254469 A1 * | 11/2005 | Verma et al. .................. | 370/338 |
| 2006/0176872 A1 * | 8/2006 | Serna et al. .................... | 370/351 |
| 2007/0213058 A1 | 9/2007 | Shaheen | |
| 2010/0035609 A1 | 2/2010 | Hui et al. | |

FOREIGN PATENT DOCUMENTS

| | | |
|---|---|---|
| CN | 1549611 A | 11/2004 |
| CN | 1744761 A | 3/2006 |

(Continued)

*Primary Examiner* — Phuongchau Ba Nguyen
(74) *Attorney, Agent, or Firm* — Coats & Bennett, PLLC

(57) ABSTRACT

A method for moving MS in the manner of the least packet loss can be divided into two steps. In the first step, when the MS is still connected to the source CN node and is running the effective loads, the MS prepares the routing information pointing at the target CN node. In the second step, the connection between the source CN node and the RAN node is released, the MS ID, the context data and the mobile information are transmitted to the target CN node. Then, a new connection between the target CN node and the RAN node is established. The step is completed synchronously and rapidly to minimize the packet loss. When establishing a new connection, the routing information transmitted to the MS before is used so that a new CN node is pointed at.

10 Claims, 8 Drawing Sheets

(56) References Cited

FOREIGN PATENT DOCUMENTS

| CN | 1917697 | A  | 2/2007  |
| EP | 2053871 | A1 | 4/2009  |
| WO | 03/036872 | A1 | 5/2003  |
| WO | 2008019631 | A1 | 2/2008  |
| WO | 2008100488 | A1 | 8/2008  |
| WO | 2008128452 | A1 | 10/2008 |

* cited by examiner

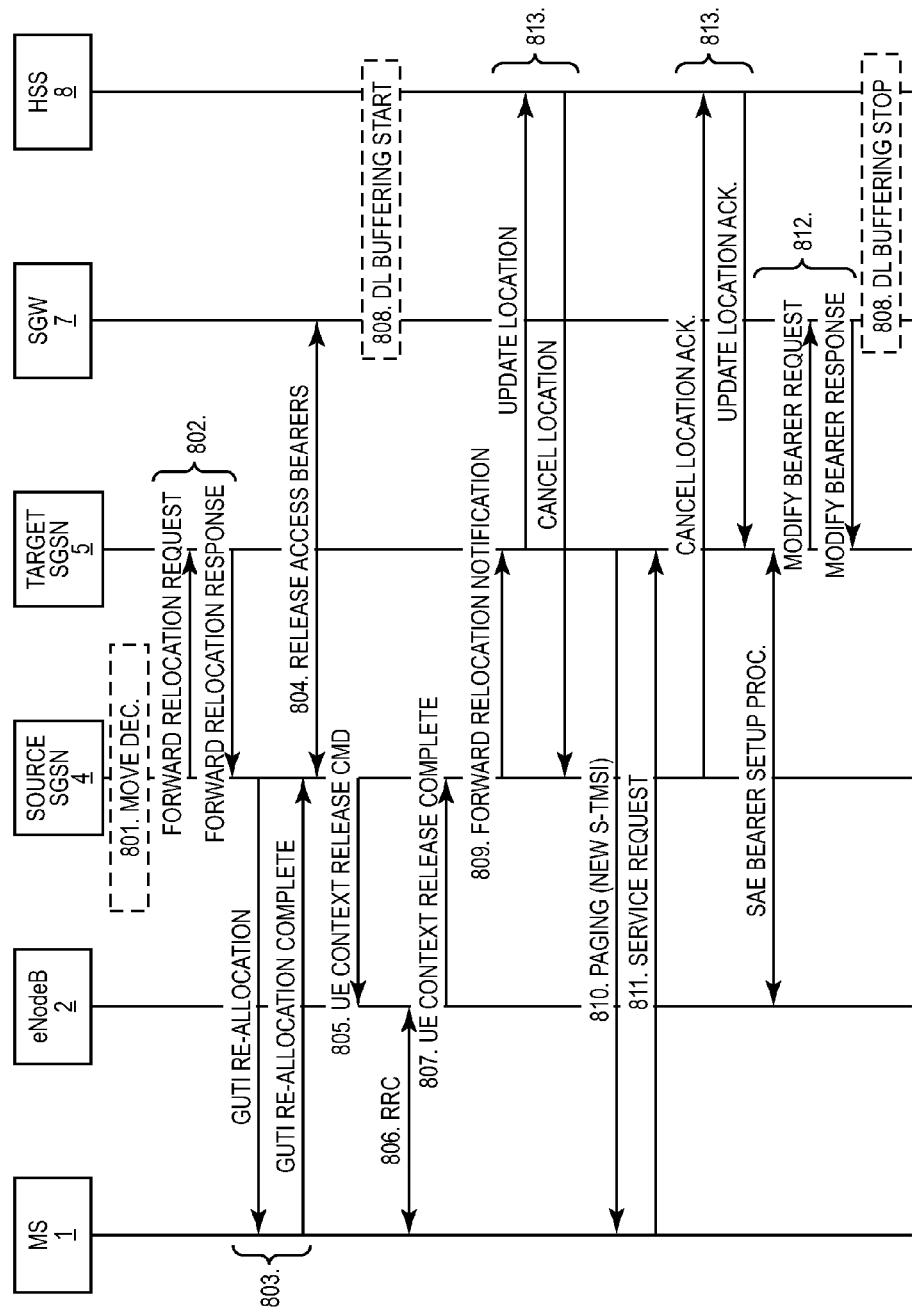

APPARATUS AND METHOD FOR MOVING WCDMA MOBILE STATION IN THE MANNER OF THE LEAST PACKET LOSS

This application claims the benefit and priority of PCT/EP2009/002340, entitled "REDISTRIBUTION OF TERMINALS", which is incorporated by reference herein in its entirety.

TECHNICAL FIELD

The present invention relates to a solution for moving a MS in a wireless communication network with minimized packet loss and in particular to a solution for handling attachments in the network.

BACKGROUND

When user equipment (UE or MS) attaches to a cellular network it connects to a core network entity that may be a member of a pool of core network entities, e.g., for WCDMA or LTE case a mobility management device (MME), e.g., a Serving GPRS Support Node (SGSN) or Mobility Management Entity (MME). Standardization protocols enable movement between different SGSNs of subscribers performing Routing Area Update (RAU) and at attachment, but also the means necessary to move remaining subscribers not performing any of these operations. The remaining subscribers are those that are immobile enough to not perform a RAU and at the same time are running payload frequently enough to not execute the periodic RAU procedure. Movement of these subscribers may be performed by executing a detach procedure, with reattach required.

Redistribution of MSs in an SGSN Pool is described in 3GPP TS 23.236 and for an MME Pool in 3GPP 23.401. The Re-distribution of MSs is initiated via an O&M command in the CN node, which needs to be off-loaded.

In a first phase (a couple of Periodic LU/RAU periods long), MSs performing RAU or Attachment are moved to other SGSNs in the pool. When the SGSN receives the Routing Area Update or Attach request, it returns a new P-TMSI with a null-NRI, and a non-broadcast RAI in the accept message.

In the PS domain, a new Routing Area Update is triggered by setting the periodic routing area update timer to a sufficiently low value (recommended value is 4 seconds) in the accept message. The MS will shortly thereafter send a new Routing Area Update that the RAN node then will route to a new SGSN due to the presence of a null-NRI.

In a second phase, the SGSN requests all MSs trying to set up PDP Contexts to detach and reattach. When they reattach, the SGSN moves the MSs as in the first phase described above.

A third phase includes scanning through the remaining MSs and initiating a move of the MSs to other SGSNs. In the PS domain MSs are requested to detach and reattach, which will cause them to be moved MSs being moved from one SGSN are stopped from registering to the same SGSN again by an O&M command in BSCs and RNCs connected to the pool. MSs moving into a pool area may also be stopped from registering into a SGSN being off-loaded in the same manner.

According to 3GPP 23.236, in an SGSN Pool, there are situations where a network operator will wish to remove load from one SGSN node in an orderly manner (e.g., to perform scheduled maintenance, or, to perform load re-distribution to avoid overload) with minimal impact to end users and/or without placing additional load on other entities. The re-distribution procedure does not require any new functionality in the terminal, that is, all terminals can be moved.

However, when an MS is in PMM-CONNECT (i.e., is active), it will not perform periodic RAUs or attachments. With the solution suggested in 23.236, if operators want to move the MSs in PMM-CONNECT with PDP, the current PS service will be interrupted. The MS has to re-establish the service in the target SGSN of the move.

Such interruptions are unacceptable for the MS doing uninterruptible service, such as VoIP, FTP, streaming, and so on. A procedure of moving an MS in PMM-CONNECT with minimized packet loss is therefore a highly wanted feature.

Moreover, the existing solution has the following problems:

No standardized way or suggestion on how to move active subscribers in SGSN from one pool member to another without using the crude detach.

Payload interrupts, which could last many seconds during move operations between pool members, exist. This is valid for load re-balancing of both the SGSN Pool and the MME Pool.

The standardized way to perform load re-balancing between MMEs is based on distribution performed by the eNodeB. This means that without additional information the eNodeB may only perform random distribution of MSs based on the MME capacity weight and is not able to consider end-user behavior and its impact on the MME load.

An arrangement and a method for moving active subscribers without significant service interruption are therefore highly desired.

SUMMARY

It is therefore an object of the present invention to provide a solution for moving subscriber's contexts without significant service interruptions. This will be exemplified in a WCDMA environment and in an LTE environment.

The purpose of moving an active subscriber, i.e., an MS in PMM-CONNECT is to make it possible to seamlessly move active subscribers (i.e., subscribers running payload) from a source CN node (e.g., SGSN) to a target CN node (e.g., SGSN) in the pool, i.e., they should be moved with minimized packet loss.

The basic idea of this invention in the WCDMA example may be described in two steps:

In step one the MS is prepared with routing information pointing to the target CN node while it is still connected to the source CN node and while it is running payload.

In step two the connection between the source CN node and the RAN node is released. The MS ID, context data, and mobility info are communicated to the target CN node. Then a new connection is setup between the target CN node and the RAN node. This is done in a synchronized and fast manner, thus minimizing the packet loss. At setup of the new connection, the routing information previously sent to the MS is used, thus pointing to the new CN node.

The way of handling the payload path from the CN towards the RAN depends on the network architecture and is therefore different in the E-UTRAN (MME) and UTRAN (SGSN) case as well as if 3GDT (UTRAN only) is used or not.

The objects of the present invention are provided in a number of aspects, in which a first is a source attachment node (4, 200) in a wireless communication network, the source attachment node comprising:

a processing unit (201);
a memory (202); and
a communication interface (204);
wherein the processing unit is configured to execute instruction sets stored in the memory to receive MS (1) related information and to handle the attachment status of the MS, and further is configured to move attachment of the active MS from the source attachment node (4) to a target attachment node (5) by:
obtaining a decision to move the MS to the target attachment node;
transmitting reallocation messages to the MS; and
paging the MS.

The source and target attachment nodes may be one of a Serving GPRS Support Node and a Mobility Management Entity.

The source attachment node may further be configured to receive a cancel location message from a subscription server.

The source attachment node may further be configured to exchange bearer modification messages with a gateway (7).

A second aspect of the present invention is provided in a source attachment node (4, 200) in a wireless communication network, the source attachment node comprising:
a processing unit (201);
a memory (202); and
a communication interface (204);
wherein the processing unit is configured to execute instruction sets stored in the memory to receive MS (1) related information and to handle the attachment status of the MS, and is further configured to move attachment of the active MS from the source attachment node (4) to a target attachment node (5) by:
obtaining a decision to move the MS to the target attachment node;
exchanging MS communication data with the target attachment node;
exchanging re-allocation message with the MS; and
sending a relocation message to the target attachment node.

The source and target attachment nodes may be one of a Serving GPRS Support Node and a Mobility Management Entity.

The source attachment node may further be configured to receive a cancel location message from a subscription server.

The source attachment node may further be configured to exchange bearer modification messages with a gateway (7).

The source attachment node may further be configured to transfer security context data to the target attachment node.

A third aspect of the present invention is provided, where a target attachment node (5, 200) in a wireless communication network comprises:
a processing unit (201);
a memory (202); and
a communication interface (204);
wherein the processing unit is configured to execute instruction sets stored in the memory to receive MS (1) related information and to handle the attachment status of the MS, and is further configured to receive an attachment of the MS from a source attachment node (4) by:
receiving service request from the MS;
requesting MS communication data from the source attachment node; and
re-establishing bearer connection for the MS.

The target attachment node may further be configured to receive and buffer downlink payload data destined for the MS until re-establishment of bearer connection is executed.

The target attachment node may further be configured to discard payload data destined for the MS until re-establishment of bearer connection is executed.

The target and source attachment nodes may further comprise one of a Serving GPRS Support Node and a Mobility Management Entity.

The target attachment node may further be configured to send an update location message to a user subscription service (8).

The target attachment node may further be configured to exchange bearer modification messages with a gateway (7).

A fourth aspect of the present invention is provided, where a target attachment node in a wireless communication network comprises:
a processing unit (201);
a memory (202); and
a communication interface (204);
wherein the processing unit is configured to execute instruction sets stored in the memory to receive MS (1) related information and to handle the attachment status of the MS, and is further configured to receive attachment of the MS from a source attachment node (4) by:
exchanging user equipment communication data with the source attachment node;
paging the MS; and
re-establishing bearer connection for the MS.

The target attachment node may further be configured to receive and buffer downlink payload data destined for the MS until re-establishment of bearer connection is executed.

The target attachment node may further be configured to discard payload data destined for the MS until re-establishment of bearer connection is executed.

The target and source attachment nodes may further comprise one of a Serving GPRS Support Node and a Mobility Management Entity.

The target attachment node may further be configured to send an update location message to a user subscription service (8).

The target attachment node may further be configured to exchange bearer modification messages with a gateway (7).

A fifth aspect of the present invention is provided, where a method handling the attachment status for a MS (1) in a wireless communication network (6) comprises:
transmitting reallocation messages to the MS by a source node;
receiving in the MS new identification data from the source node;
sending service request to a target node by the MS;
requesting MS communication data from the source node by the target node; and
re-establishing bearer connection.

The method may further comprise buffering downlink payload communication data.

The method may further comprise communicating subscription data with a subscription server.

A sixth aspect of the present invention is provided, where a method handling the attachment status for a MS (1) in a wireless communication network (6) comprises:
exchanging MS information between a source (4) and target (5) network node;
receiving in the source network node new identification data for the MS from the target network node;
exchanging re-allocation messages between the source network node and the MS;
transferring from the source network node new identification data to the MS; and
re-establishing bearer connection.

The method may further comprise buffering downlink payload communication data.

The method may further comprise communicating subscription data with a subscription server.

The method may further comprise discarding payload data destined to the MS until re-establishment of bearer connection is executed.

The aspects of the present invention provide a number of advantages as compared to known solutions:

It is unnecessary to change any of current 3GPP messages, which makes implementation very easy.

It improves the perception and the value of the SGSN Pool features by moving the MS with payload, and without detaching and re-attaching. Then all of the PDP contexts can be kept in the target SGSN with minimized packet/service loss.

It is possible to select a target CN node from the CN, in contrast to the possibilities in the standardized solution.

It provides a RAN vendor independent solution.

It improves service availability

These and other aspects of the invention will be apparent from and elucidated with reference to the embodiments described hereinafter.

BRIEF DESCRIPTION OF THE DRAWINGS

FIG. 8 illustrates schematically a signaling method according to another embodiment of the present invention.

DETAILED DESCRIPTION

Figure 1:
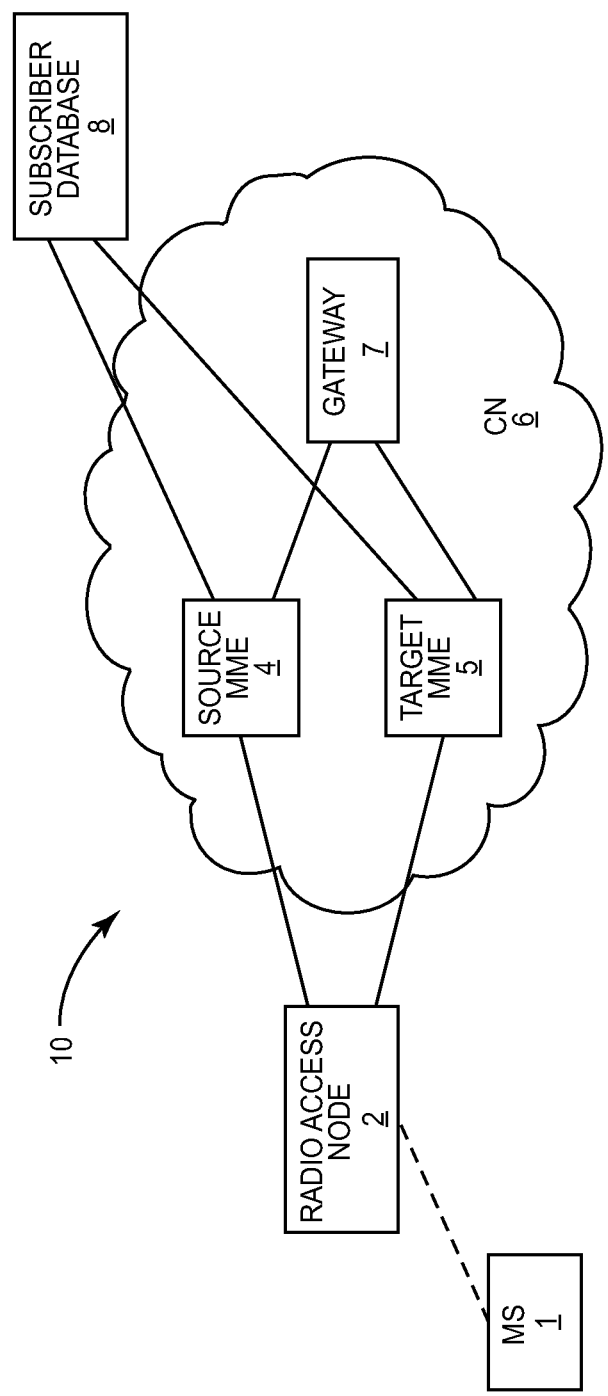
FIG. 1 illustrates schematically a network according to the present invention.

In FIG. 1 reference numeral 10 generally indicates a network according to the present invention. The network comprise an infrastructure core network (CN) 6 comprising devices for operating a suitable communication protocol. The infrastructure comprises in this example mobility management devices 4 and 5 in communication with a radio access network device 2. The mobility management devices/nodes may for instance be a Serving GPRS Support Node (SGSN) or a Mobility Management Entity (MME), and the radio access network devices 2 may be for instance a Radio Network Controller (RNC) or an eNodeB. The mobility management devices are in turn connected to a network gateway 7, e.g., a Gateway GPRS Support Node (GGSN) or a Serving gateway (SGW). The MME 4, 5 are in turn in communication with a subscriber database 8, e.g., Home Location Register (HLR) or a Home Subscriber Server (HSS).

The infrastructure mobility management entities 4, 5 (MME) provide mobility management of MS (-Mobile Station or UE-User Equipment) 1 between different MMEs in the core network. The MS 1 attaches to the network via a radio access device 2 and this in turn communicate with the mobility management entity 4 or 5. In the present invention a method is provided to move the MS's contexts from one MME 4 to another MME 5. This will be exemplified for two scenarios: WCDMA and LTE based communication networks.

Figure 2:
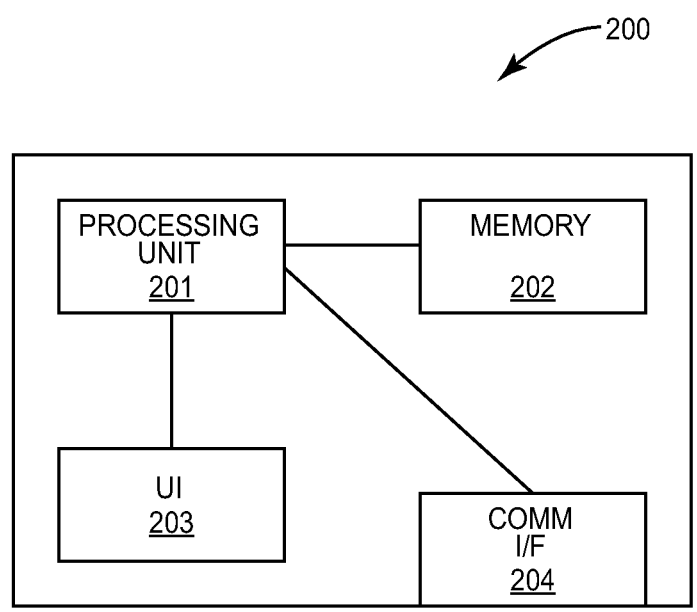
FIG. 2 illustrates schematically a device according to the present invention.

FIG. 2 shows a device 200 executing in a processing unit 201 instruction sets in program code stored in a memory 202 for executing method steps according to the present invention. The device also comprises a communication interface 204 and optionally a user interface 203. The processing unit 201 is arranged to execute the instruction sets and to use the communication interface 204 for communicating control traffic and/or data traffic via the network 6 (shown in FIG. 1). The processing unit 201 may comprise any suitable type of processing unit, such as a micro processor, a field programmable gate array (FPGA), an application specific integrated circuit (ASIC) or similar computational/processing unit. Furthermore, the memory 202 may be any type of suitable memory, volatile or non-volatile type, such as RAM, DRAM, flash type, hard disk, CD ROM, DVD, and so on. The communication interface 204 may comprise any suitable packet type interface, e.g., Ethernet, ATM, ADSL, Token ring, x25, or similar as understood by the skilled person. Optionally, the user interface 203 may be provided for local control of the device 200. However, the device 200 may also be remotely controlled using the communication interface 204. The program instructions may be distributed during installation to the device 200 using the communication interface 204 or using a non-volatile memory unit connected to the device 200.

Basically, a method according to the present invention may be divided into two steps. In step one, the MS 1 is prepared with routing information pointing to the target CN node 6 while it is still connected to the source CN node 6 and while it is running payload.

In step two the connection between the source CN node and the RAN node is released. MS ID, context data, and mobility info is communicated to the target CN node. Then a new connection is setup between the target CN node and the RAN node. This is done in a synchronized and fast manner, thus minimizing the packet loss. At setup of the new connection the routing information previously sent to the MS 1 is used, thus pointing to the new CN node.

The way of handling the payload path from the CN 6 towards the RAN 2 depends on the network architecture and is therefore different in the E-UTRAN (MME) and UTRAN (SGSN) case as well as if 3GDT (UTRAN only) is used or not.

Figure 3:
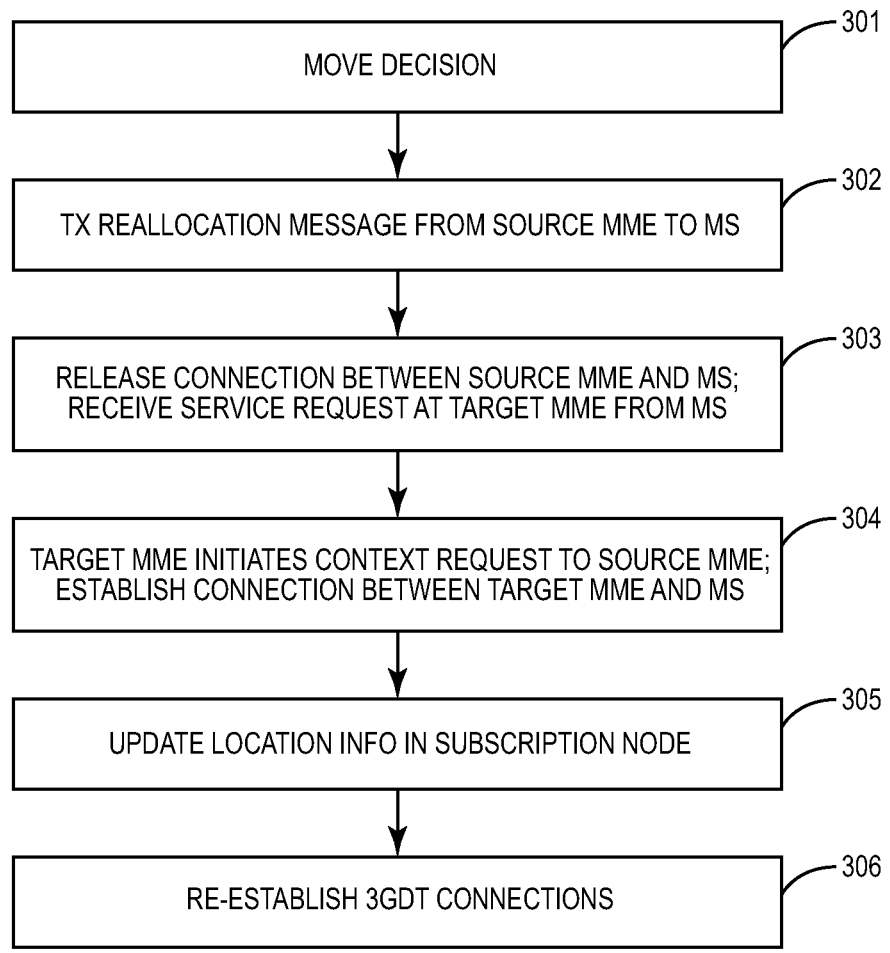
FIG. 3 illustrates a specific example of the method according to the present invention in a more detailed form.

FIG. 3 illustrates a specific example of the method according to the present invention in a more detailed form:

301. A decision is taken to move the MS's contexts from one MME 4 to another MME 5. This decision may be taken in a source MME 4 or elsewhere in the infrastructure network depending on reason for decision or where statistical analysis is provided if the decision is based on statistics.

302. The source MME 4 transmits reallocation messages to the MS 1.

303. Connection between the source MME 4 and the MS 1 is released, and a target MME 5 receives service request from the MS 1.

304. The target MME 5 initiates a Context Request to the source MME 4 and a new connection between the target MME 5 and the MS 1 is established, wherein the target MME 5 takes over control of the control plane.

305. The location information in subscription node 8, e.g., HLR or HSS, is updated.

306. The 3GDT connections are re-established.

It should be noted that payload paths and data may be handled in different ways depending on configuration. This will be discussed later in this document in relation to respective configurations.

Figure 4:
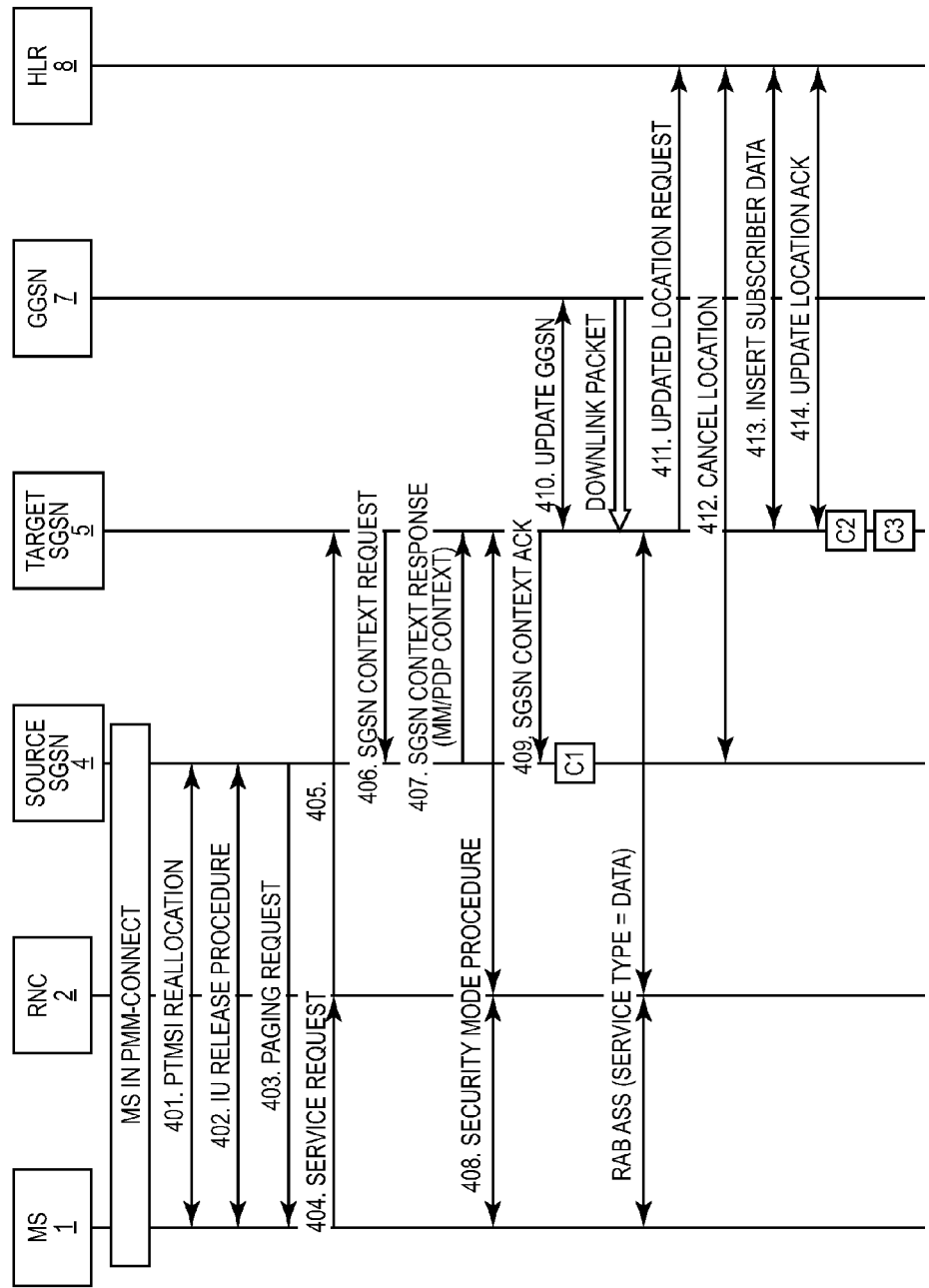
FIG. 4 illustrates a process for moving an MS from one SGSN to another SGSN according to one embodiment of the present invention.

Referring to FIG. 4, in one of WCDMA exemplary cases, moving an active subscriber from a source SGSN 4 to a target SGSN 5 involves the following steps:

Step 401: For an MS 1 in PMM-CONNECT, the source SGSN 4 initiates a P-TMSI Reallocation procedure to the MS 1. The NRI in the P-TMSI is set to point to the target SGSN 5, which the MS 1 should be moved to. The P-TMSI reallocation should avoid repetition with the P-TMSI in the target SGSN 5, and include the information of the source SGSN 4. This relies on network topology.

Step 402: The source SGSN 4 releases the Iu connection toward the MS 1 so as to leave MS 1 in PMM-IDLE.

Step 403: If MS 1 has any uplink, it will initiate a service request to RNC 2. Source SGSN 4 can also page the MS 1 or submit a paging request to MS 1.

Step 404: After receiving the paging request, MS 1 can also initiate service request to RNC 2.

Step 405: When receiving the service request from MS 1, RNC 2 will route the service request to the target SGSN 5 because the NRI in the P-TMSI points to the target SGSN 5.

Step 406: After receiving the service request form MS 1, target SGSN 5 can identify that the move is made for MS 1, i.e., it is an MS move, and initiate SGSN Context Request to source SGSN 4.

Step 407: As a reply, the source SGSN 4 returns an SGSN Context Response (MM/PDP context). Note that the resolution of the old SGSN is strongly related with the P-TMSI reallocation. It also relies on network topology. Note that the whole procedure will follow the inter SGSN RAU procedure without RAU accept.

Step 408: Upon receiving the SGSN context response, a security function will be used by target SGSN 5. Namely, a security mode procedure is carried out between the MS 1 and the target SGSN 5 via RNC 2.

Step 409: Target SGSN 5 returns a SGSN Context ACK to source SGSN 4.

Step 410: After sending the SGSN Context ACK to source SGSN 4, target SGSN 5 updates GGSN 7 and initiates a RAB ASS procedure toward RNC 2 due to the service type in the service request being "DATA" or a downlink packet from GGSN 7.

Step 411: Target SGSN 5 sends an Update location request to HLR 8.

Step 412: HLR 8 sends a Cancel location command to source SGSN 4 in response to the Update location request.

Step 413: The insertion of the subscriber data occurs between the target SGSN 5 and HLR 8.

Step 414: HLR 8 sends an Update location ACK to target SGSN 5.

In step 401, typically source SGSN 4 can process P-TMSI reallocation in the following manner.

(1) New P-TMSI=F1 (target NRI) with Broadcast RAI, where the target NRI is used to identify the target SGSN 5, and the Broadcast RAI is used by target SGSN 5 to find the source SGSN 4.

(2) New P-TMSI=F2 (target NRI, source NRI, move information) with current RAI, where the target NRI is used to identify the target SGSN 5, the source NRI is used by target SGSN 5 to find the source SGSN 4, and move information is used by target SGSN 5 to identify that current procedure is a move.

In FIG. 4, C1, C2 and C3 mean the CAMEL procedure calls shall be performed. The details can be found in 3GPP 23.060, which is incorporated by reference in its entirety.

In the above example, the basic idea is to move MS 1 with PDP/payload to another SGSN 5 in the pool without detaching the MS 1 and keeping all PDP contexts at the target SGSN 5 so as to minimize packet loss.

Figure 5:
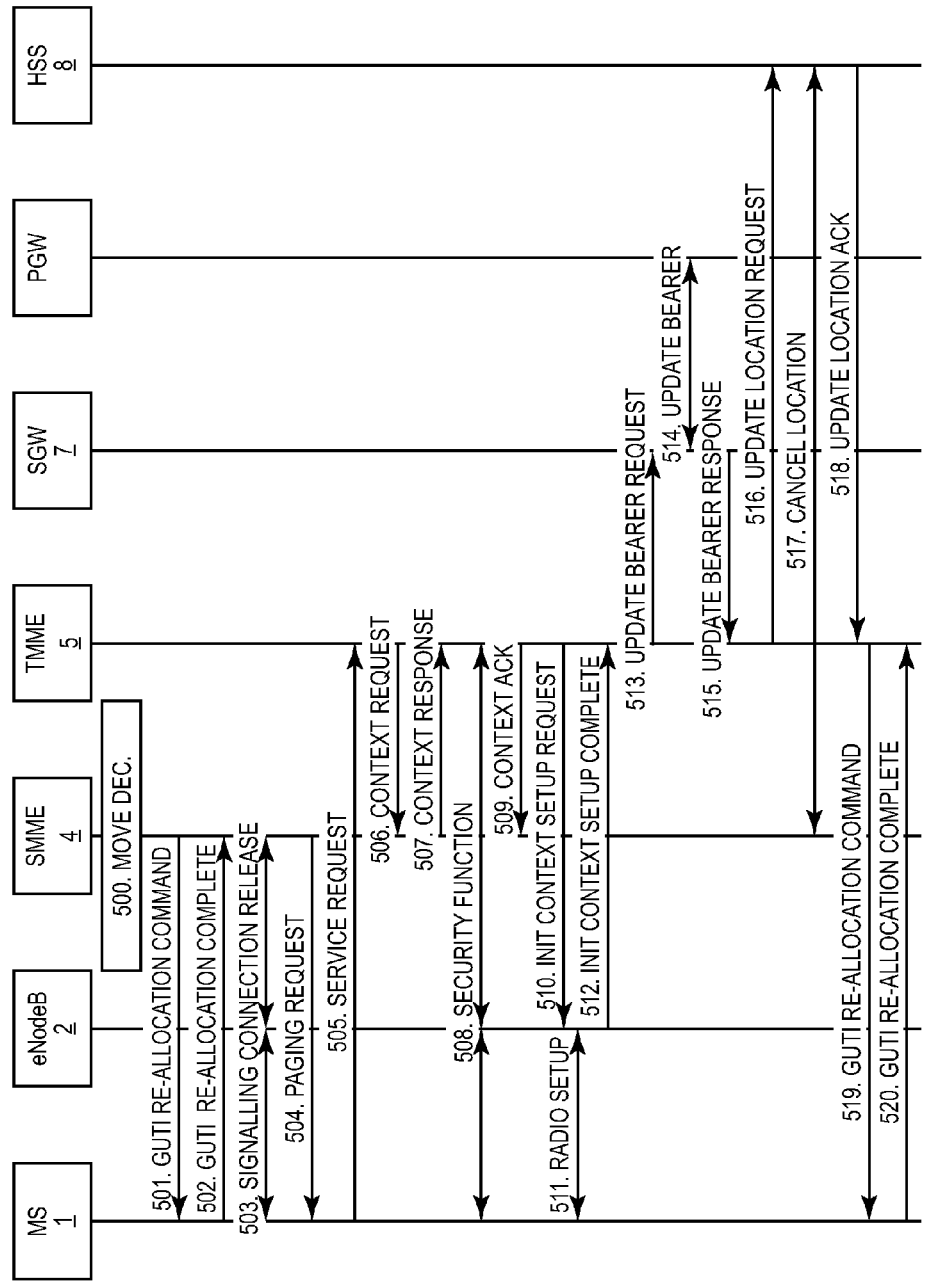
FIG. 5 illustrates a process for moving an MS from one SGSN to another SGSN according to another embodiment of the present invention.

Below follows a description of the individual components and their respective conditions in another WCDMA example. Furthermore, the actual move procedure is described with reference to FIG. 5.

Step 500: A move decision is made by source MME 4 for the MS 1.

Step 501: Source MME 4 initiates a GUTI reallocation procedure for the MS 1. Information for target MME 5 to identify source MME 4 and move procedure should be included in the GUTI. Note that if MS 1 is not in ECM-connect, the source MME 4 will page the MS 1 before this step.

Step 502: The MS 1 responds with a GUTI Reallocation Complete message towards the source MME 4.

Step 503: Source MME 4 releases the signaling connection.

Step 504: Source MME 4 pages the MS 1 by sending a Paging request to MS 1.

Step 505: MS 1 accepts the paging request, and initiates a service request procedure. Because of the target MME ID in the GUTI, the message is routed to target MME 5 by enodeB 2.

Step 506: While receiving the service request, target MME 5 identifies a move procedure and a source MME ID from the GUTI, and sends a context request to source MME 4 to fetch the context of the MS 1.

Step 507: As a reply, source MME 4 returns a Context response.

Step 508: Then, target MME 5 initiates security function. Namely, target MME 5 interacts with MS 1 via eNodeB 2 to perform a security process.

Step 509: Then, target MME 5 sends a Context ACK to source MME 4.

Step 510: Target MME 5 initiates a context setup procedure to establish the bearer.

Step 511: Then, between MS 1 and eNodeB 2, a Radio setup is carried out.

Step 512: Upon completion of the Radio setup, eNodeB 2 sends a message Init context setup complete to target MME 5.

Step 513: Target MME 5 initiates an update bearer procedure to SGW 7.

Step 514: Then, the update bearer procedure is carried out by SGW 7 and the PGW.

Step 515: SGW 7 sends an Update bearer response to the target MME 5.

Step 516: Target MME 5 initiates an update location procedure to HSS 8.

Step 517: As a response, HSS 8 initiates a cancel location procedure to source MME 4.

Step 518: Upon completing the cancel location procedure, HSS 8 sends an Update location ACK to the target MME 5.

Step 519: A real GUTI of target MME 5 is allocated to the MS 1.

Step 520: As a response, MS 1 returns a GUTI reallocation complete message to target MME 5.

Figure 6:
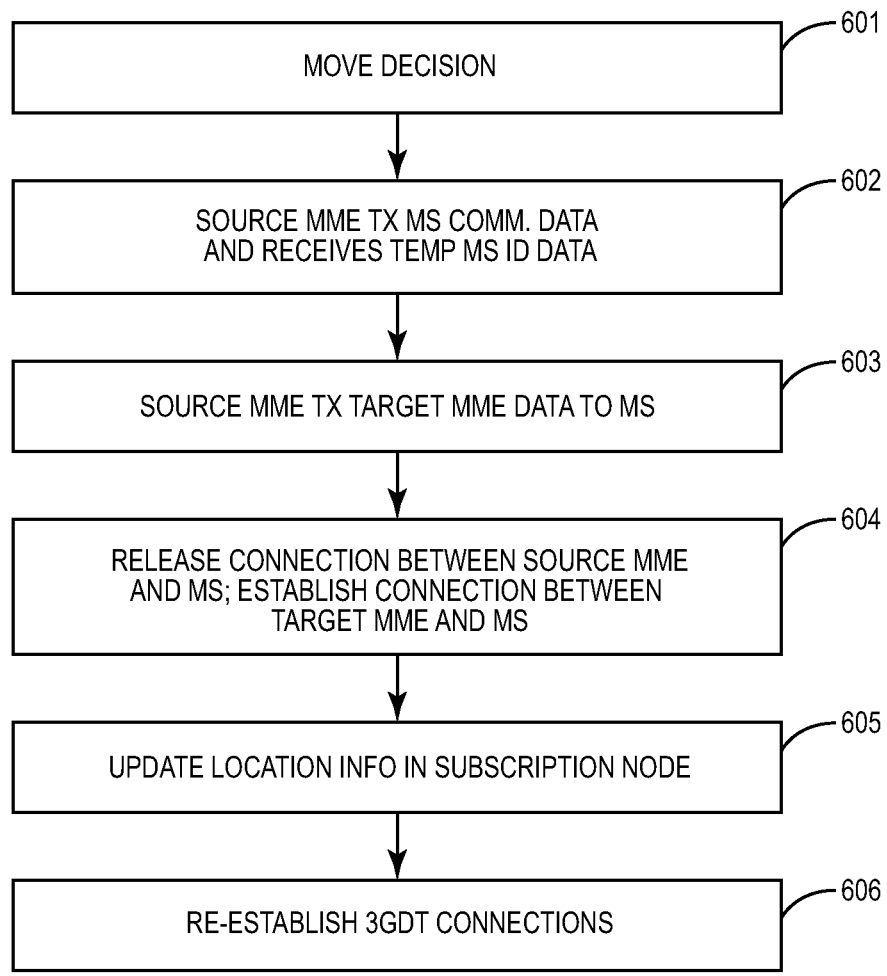
FIG. 6 illustrates another specific example of the method according to the present invention in a more detailed form.

FIG. 6 illustrates another specific example of the method according to the present invention in a more detailed form:

601. A decision is taken to move the MS's contexts from one MME to another MME. This decision may be taken in a source MME 4 or elsewhere in the infrastructure network depending on the reasons for the decision, or where the statistical analysis is provided if the decision is based on statistics.

602. The source MME 4 transmits MS communication data, e.g., MM and PDP context data, including security context data to a target MME 5, and receives from the target MME 5 temporary MS identity data.

603. The source MME 4 transmits data relating to the target MME 5 to the MS 1.

604. The connection between the source MME 4 and the MS 1 is released, where the release information is sent to the target MME 5 and a new connection between the target MME 5 and the MS 1 is established, wherein the target MME 5 takes over control of the control plane.

605. The location information in a subscription node 8, e.g., HLR or HSS, is updated.

606. The 3GDT connections are re-established.

In another WCDMA exemplary case, moving an active subscriber from a source MME 4, i.e., an SGSN, to a target MME 5, i.e., an SGSN, involves several parts:

1. Transfer of the MM and PDP Contexts, including security context, from source 4 to target 5 SGSN. In this step, because the procedure is initiated by the source SGSN, the Forward Relocation procedure is used.

2. Switch the GGSN DL and UL path from source 4 to target 5 SGSN, or in the case of 3GDT, from RNC 2 to target SGSN 5.

3. Re-allocation of P-TMSI using a new P-TMSI assigned by target SGSN 5.

4. Target SGSN 5 takes over the control plane signaling by switching the Iu-connection from the RNC 2, from the source 4 to target 5 SGSN.

5. Update the location in the HLR 8.

6. Re-establish the RABs.

7. In the case of 3GDT, switch the GGSN DL and UL paths from target SGSN 5 to RNC 2.

Below follows a description of the individual components and their respective conditions in the WCDMA example. Further, the actual move procedure is described in FIG. 7.

Transfer the MM and PDP Contexts from Source to Target SGSN Including Security Context:

MM and PDP contexts may be moved between two SGSNs, either by use of the SGSN Context procedure (used at ISRAU) or by use of the Forward Relocation procedure (used at PS Handover and SRSN relocation).

As the SGSN Context procedure is started by the target (new) SGSN 5, it requires that the target SGSN 5 be aware of the need to move the MS's context. This is also the case when an MS 1 is moved by use of pRAU, but for an MS 1 running payload there will be no pRAU, and that excludes this procedure.

Preferably, the Forward Relocation procedure is therefore used and is initiated by the source SGSN 4.

Switch the GGSN DL and UL Paths from Source to Target SGSN, or in the Case of 3GDT, from RNC to Target SGSN:

By using the Update PDP Context procedure it is possible to give GGSN 7 the target SGSN's IP address and TEID for each PDP Context, thereby switching the SGSN-GGSN payload tunnel from source 4 to target 5 SGSN.

Reallocate the P-TMSI Using a New P-TMSI Assigned by the Target SGSN:

Reallocation of P-TMSI is necessary when entering a new SGSN, and is normally done through either Attach or RAU Accept with the subsequent Attach or RAU Complete message. In the case of moving an active subscriber neither of these procedures is at hand. Instead, there is a stand-alone P-TMSI re-allocation procedure standardized in 3GPP.

Target SGSN Takes Over the Control Plane Signaling by Switching the Iu-Connection from the RNC, from Source to Target SGSN:

As the Iu-connection between the RNC 2 an the SGSN is closely related to an RRC connection between the RNC 2 and the MS 1, it is not possible to just switch the Iu-connection between source 4 and target 5 SGSN without affecting the RRC connection, at least not without co-operation from the RNC 2. The procedure will therefore in the first step involve the task of releasing the Iu-connection in the source SGSN 4 thereby also releasing the RRC connection. The target SGSN 5 must therefore in the second step page the MS 1 (using the new P-TMSI) in order to set up an Iu-connection from target SGSN 5 and establish a new RRC connection. In case the MS 1 spontaneously issues a Service Request (data), paging will not be necessary. Following this, by use of the Security Mode procedure, a security context is re-established in the RNC 2.

Update the Location Information in a Subscription Node 8, e.g., HLR or HSS:

This is the same as a normal update of location used, e.g., at Inter SGSN RAU, and handled by the Update Location procedure.

Re-Establish the RABs, and in the Case of 3GDT, Switching the GGSN DL and UL Paths from the Target SGSN to the Source RNC:

This is handled as normal through the RAB Assignment procedure. In the case of 3GDT, the RNC 2 will be given an IP address and TEID for the GGSN 7, and after the RAB Assignment procedure is concluded, the GGSN 7 will be updated with the IP address and TEID for the RNC 2 regarding user plane.

Figure 7:
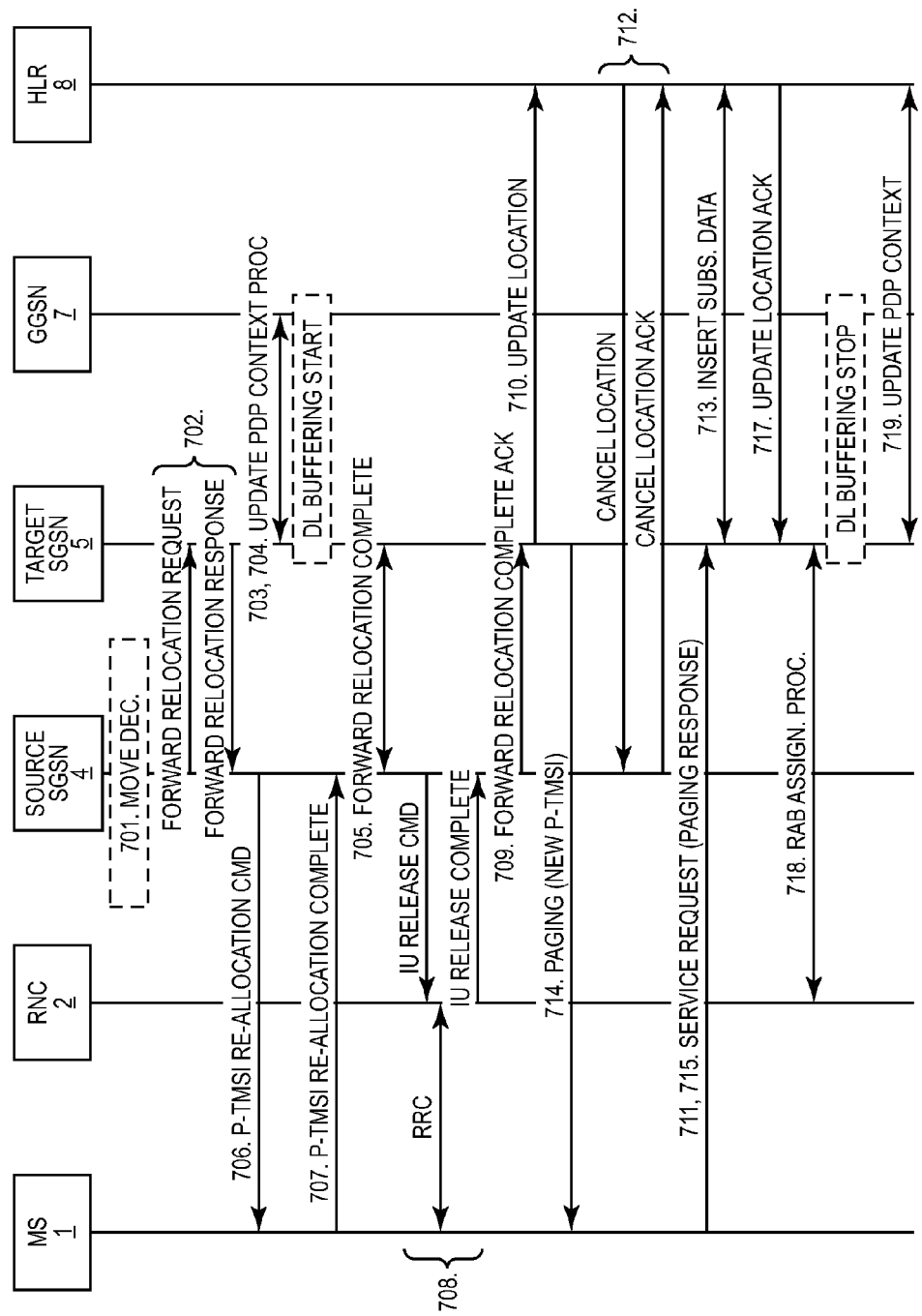
FIG. 7 illustrates schematically a signaling method according to another embodiment of the present invention.

The Movement of Active Subscriber Procedure:

In view of the above described individual components the following procedure is proposed as seen in FIG. 7. It should be noted that not all steps are shown in FIG. 7 in order to provide an overview of the invention and that included message parameter fields are shown as examples only.

701. The source SGSN 4 decides to move an MS 1 and sends a Forward Relocation Request message (IMSI, TEID control plane, RANAP Cause, MM Context, PDP Context, SGSN control plane address, Target Identification=empty, UTRAN Transparent container=empty, Private Extension including Move indicator) towards the selected target SGSN 5. By this step, the MM and PDP Contexts are transferred from the source SGSN 4 to the target SGSN 5.

702. The target SGSN 5 validates the request with respect to IMSI analysis, roaming restrictions, used ciphering algorithm, etc. If the new MS 1 can not be accepted, the request is rejected; otherwise it is assigned a new P-TMSI and a Forward Relocation Response message (e.g., with control parameters Cause, TEID control plane, SGSN control plane address, Private Extension including new P-TMSI) is sent to source SGSN 4.

703. In order to switch the GGSN DL and UL paths from source 4 to target 5 SGSNs, the target SGSN 5 sends, per PDP context, an Update PDP Context Request message to the GGSN 7.

704. The GGSN 7 updates the PDP context fields and returns an Update PDP Context Response message to the target SGSN 5. From this point, DL packets from GGSN 7 will be directed towards the target SGSN 5, and UL packets are still sent from source SGSN 4 towards GGSN 7. The DL packets may be discarded or buffered until a new Iu-connection and RABs are established between the MS 1 and the target SGSN 5.

705. The target SGSN 5 informs the source SGSN 4 that the switching of the SGSN-GSN payload is complete by sending a Froward Relocation Complete message.
706. The source SGSN 4 starts re-allocation of the P-TMSI using the new P-TMSI Assigned in target SGSN 5 and received in step 2. Source SGSN 4 sends a P-TMSI Reallocation Command (new P-TMSI) message to the MS 1.
707. The MS 1 responds with a P-TMSI Reallocation Complete message towards the source SGSN 4. Now the MS 1 has a P-TMSI including an NRI pointing to the target SGSN, 5 but signaling will still be directed towards the source SGSN 4 as long as the current Iu-connection remains.
708. To release the Iu-connection between the RNC 2 and the source SGSN 4, the source SGSN 4 performs the Iu Release procedure (Iu Release Command followed by the response Iu Release Complete). This procedure implies also the release of the RRC-connection. As a consequence of the Iu-release, all possible RABs will also be released.
709. As a confirmation of the completed P-TMSI Reallocation procedure and the Release of the Iu-connection, the source SGSN 4 sends a Forward Relocation Complete ACK message to the target SGSN 5.
710. The target SGSN 5 informs the HLR 8 of the change of SGSN by sending an Update Location message to the HLR 8.
711. If the MS 1 wants to send uplink data, it will issue a Service Request (data) in order to re-establish the Iu-connection and the RABs.
712. The Cancel Location procedure is performed between the HLR 8 and the source SGSN 4.
713. The Insert Subscriber Data procedure is performed between the HLR 8 and the target SGSN 5.
714. If the MS 1, in step 11, did not issue a Service Request (data), then the target SGSN 5 will page the MS 1 using a Paging Request message including the new P-TMSI.
715. The MS 1 responds with a Service Request (paging response), which due to the New P-TMSI will be directed toward the target SGSN 5.
716. In order to re-establish the security context in the RNC 2, the target SGSN 5 starts the Security Mode procedure.
717. The HLR 8 acknowledges the Update Location by sending an Update Location Acknowledge message to the target SGSN 5.
718. The target SGSN 5 will, by using the RAB Assignment procedure, set up the RABs towards the RNC 2, to be able to send and receive payload to and from the MS 1. In case of 3GDT, the RNC 2 will be given the IP addresses and TEIDs of the GGSN 7.
719. In case of 3GDT, the GGSN 7 needs to be updated with IP addresses and TEIDs of the RNC 2 regarding the user plane. This is done by use of the Update PDP Context procedure.

If the MS 1 to be moved is not in a CONNECTED state then some procedures will be omitted. Furthermore, the MS 1 needs to be paged and the Iu-connection must be established before performing the P-TMSI reallocation procedure. After completion of the P-TMSI reallocation procedure, the Iu-connection will be released.

In summary, movement in an SGSN pool for WCDMA may be described as follows:

The first step involves parts of the Inter-SGSN inter SRNS procedure, i.e., the Forward Relocation Request and Response messages. These are used to exchange MS context data and the new P-TMSI (allocated in new SGSN) between the old 4 and new 5 SGSN.

As the next step, the old SGSN 4 reallocates the P-TMSI using the new P-TMSI pointing to the new SGSN 5. At the same time in the new SGSN 5, the payload paths to and from GGSN 7 are switched from old to new SGSN (or in the case of 3GDT, from RNC 2 to new SGSN 5). Downlink payload packets are then buffered or discarded in the new SGSN 5.

After receiving the Forward Relocation Complete message (saying that the payload path switches towards GGSN is completed) and concluding the P-TMSI reallocation, the old SGSN 4 releases the Iu and informs the new SGSN 5. The new SGSN 5 immediately pages the MS 1 (unless the MS 1 initiates a Service Request) and re-establishes the Iu and the RABs. Payload may then resume between GGSN 7 and the MS 1 via the new SGSN 5 (in case of 3GDT, updates towards GGSN re-establishes the 3GDT paths between the RNC 2 and the GGSN 7). The update Location process towards the HLR 8 is performed as soon as the new SGSN 5 is informed via the Forward Relocation Complete ACK message that the Iu connection is released in the old SGSN 4. This is discussed in relation to FIG. 7.

Movement in an LTE Case in an MME Pool Follows a Similar Procedure:

In FIG. 7 the move procedure in the WCDMA case was discussed, but in the MME case the process is slightly different and is discussed below in relation to FIG. 8, where the numbers herein in parenthesis refer to the steps in FIG. 8. The first step (801) after a move decision involves parts of the Inter-MME S1-based Handover procedure i.e., the Forward Relocation Request and Response messages (802). These are used to exchange MS context data and new GUTI (allocated in new MME) between the old and new MME. As the next step the old MME 4 uses a GUTI Reallocation procedure (803) with the new GUTI pointing to the new MME 5. To temporarily stop the downlink payload packets from the Serving Gateway (SGW) 7, a release access bearer procedure (804) is executed from the old MME 4 towards the SGW 7. This releases all bearers and the S1 connection (MS context Release Command) between the old MME 4 and the eNodeB 2 is released (805) by the S1 Release procedure (MS context Release Complete (807)), with an RRC connection release between the eNodeB 2 and the MS 1 (806). Payload packets may be buffered in the SGW 7 or discarded (808).

As a final step the new MME 5 is informed when the S1 Connection is released by sending the Forward Relocation Complete Notification message from the old MME 4 (809). This message includes the NAS Uplink and Downlink count in order to be able to seamlessly continue with the NAS ciphering. The new MME 5 then immediately pages the MS 1 (810) (unless the MS 1 initiates a Service Request (811)) and re-establishes the S1 Connection and the SAE Bearers ("E-RAB"). MME re-established the bearers at the SGW by executing the Modify Bearer Request. Payload may then resume between SGW 7 and the MS 1 via the eNodeB 2 (812). An Update Location procedure toward the HSS 8 is performed (813) as soon as the new MME 5 is informed via the Forward Relocation Complete Notification message that the S1 connection is released in the old MME 4. It should be noted that the Modify Bearer Request/Response are performed per PDN connection and that each PDN connection buffering/discard is released at this time.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

3GDT 3G Direct Tunnel
CN Core Network
CS Circuit Switched
DNS Directory Name Server
FTP File Transfer Protocol
GGSN Gateway GPRS Support Node
GPRS General Packet Radio Service
GUTI Globally Unique Temporary UE Identity
HLR Home Location Register
HSS Home Subscriber Server
LTE Long Term Evolution
MME Mobility Management Entity
MS Mobile Station
NAS Non Access Stratum
NRI Network Resource Identifier
O&M Operation and Maintenance
PS Packet Switched
P-TMSI Packet Temporary Mobile Station Identity
RA Routing Area
RAB Radio Access Bearer
RAI Radio Access Interface
RAN Radio Access Network
RAU Routing Area Update
RNC Radio Network Controller
SRNS Serving Radio Network Subsystem
SGSN Serving GPRS Support Node
TEID Tunnel Endpoint Identifier
MS User Equipment
VoIP Voice over IP (Internet Protocol)
WCDMA Wideband Code Division Multiple Access

The invention claimed is:

1. A source attachment node in a wireless communication network, comprising:
   a processing unit;
   a memory operatively connected to the processing unit; and
   a communication interface operatively connected to the processing unit;
   wherein the processing unit is configured to execute instruction sets stored in the memory to receive mobile station (MS) related information via the communication interface and handle a connection status of an MS, and is further configured to move a connection of the MS from the source attachment node to a target attachment node by:
      obtaining, via the communication interface, a decision to move the MS to the target attachment node;
      transmitting, via the communication interface, reallocation messages to the MS with an identification of the target attachment node;
      releasing a connection between the source attachment node and the MS; and
      paging the MS to move the connection of the MS from the source attachment node to the target attachment node.

2. The source attachment node according to claim 1, wherein the source and target attachment nodes comprise one of a Serving General Packet Radio Service (GPRS) Support Node and a Mobility Management Entity.

3. The source attachment node according to claim 1, wherein the processing unit is further configured to receive, via the communication interface, a cancel location message from a subscription server.

4. The source attachment node according to claim 1, wherein the processing unit is further configured to exchange, via the communication interface, bearer modification messages with a gateway.

5. A source attachment node in a wireless communication network, comprising:
   a processing unit;
   a memory operatively connected to the processing unit; and
   a communication interface operatively connected to the processing unit;
   wherein the processing unit is configured to execute instruction sets stored in the memory to receive mobile station (MS) related information and to handle a connection status of an MS, and is further configured to move a connection of the MS from the source attachment node to a target attachment node by:
      obtaining, via the communication interface, a decision to move the MS to the target attachment node;
      exchanging, via the communication interface, MS communication data with the target attachment node;
      exchanging, via the communication interface, a re-allocation message with the MS by transmitting data relating to the target attachment node to the MS;
      releasing a connection between the source attachment node and the MS; and
      sending a release information to the target attachment node to move the connection of the MS from the source attachment node to the target attachment node.

6. The source attachment node according to claim 5, wherein the node source and target attachment nodes comprise one of a Serving General Packet Radio Service (GPRS) Support Node and a Mobility Management Entity.

7. The source attachment node according to claim 5, wherein the processing unit is further configured to receive, via the communication interface, a cancel location message from a subscription server.

8. The source attachment node according to claim 5, wherein the processing unit is further configured to exchange, via the communication interface, bearer modification messages with a gateway.

9. The source attachment node according to claim 5, wherein the processing unit is further configured to transfer, via the communication interface, security context data to the target attachment node.

10. A method executed in a source attachment node of handling a connection status for a mobile station (MS) in a wireless communication network to move a connection of the MS from the source attachment node to a target attachment node, the method comprising:
   obtaining, by a processing unit in the source attachment node, a decision to move the MS to the target attachment node;
   transmitting, by the processing unit, reallocation messages to the MS with an identification of the target attachment node;
   releasing, by the processing unit, a connection between the source attachment node and the MS; and
   paging, by the processing unit, the MS to move the connection of the MS from the source attachment node to the target attachment node.

* * * * *